Aug. 21, 1945.    W. J. WIEHL    2,383,099
LUBRICATED GATE VALVE
Filed July 30, 1943
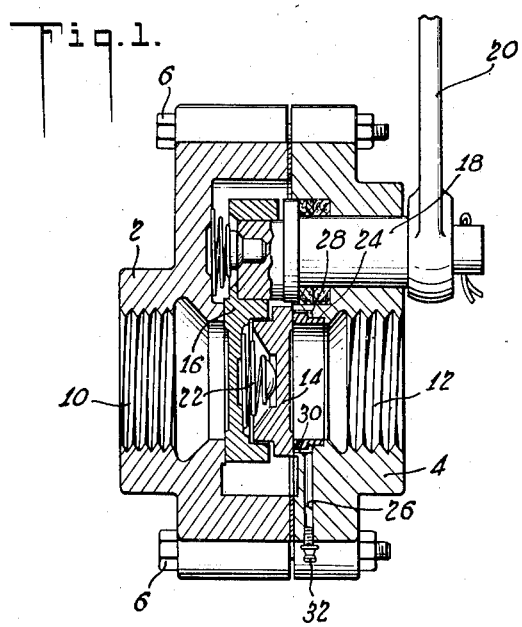
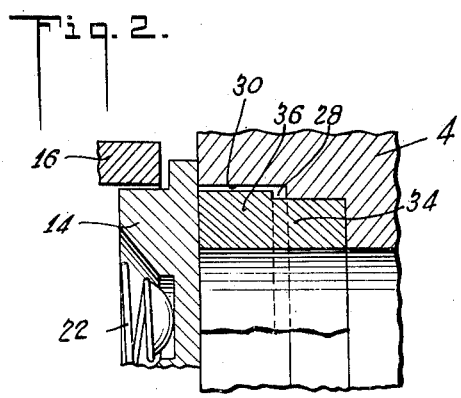
INVENTOR.
WILLIAM J. WIEHL
BY
Bartlett, Eyre, Keel & Weymouth
ATTORNEYS Patented Aug. 21, 1945

2,383,099

UNITED STATES PATENT OFFICE 2,383,099

LUBRICATED GATE VALVE

William J. Wiehl, Roselle, N. J., assignor of one-half to Everlasting Valve Company, Jersey City, N. J., a corporation of New Jersey Application July 30, 1943, Serial No. 496,759

1 Claim. (Cl. 251—18)

The present invention relates to gate valves and more particularly to the swinging gate type of gate valve wherein the gate or valve disk when in closed position is urged against its seat by spring pressure and by the pressure of the fluid in the line closed by the valve. Specifically, the invention comprises an improved valve of this type provided with means for introducing lubricant to the valve seat to lubricate the same whereby the valve disk may be readily swung to open position; the pressure of the lubricant opposing the pressures exerted by the spring and by the fluid in the line. The improved lubricated valve is simple in construction and efficient in operation.

For an understanding of the invention, reference may be had to the accompanying drawing, of which Fig. 1 is a sectional view through a valve embodying the invention; and Fig. 2 is a fragmentary enlarged view of a part of the valve of Fig. 1.

As shown in the drawing, the improved valve comprises mating casing sections 2 and 4 which are secured together at their periphery by bolts 6 and which together define a chamber within which the closure member is mounted for oscillation. Casing 2 has a threaded inlet passage 10 leading into the chamber, and casing 4 has a similar threaded outlet passage 12 in alinement with the passage 10. The closure member comprises a valve disk 14 which is carried in a recess in the free end of a lever arm 16, the other end of which is mounted on a post 18. Post 18, when rotated by a lever 20 secured to the post, swings the lever arm 16 from the closed position indicated in Fig. 1 wherein the disk 14 closes the outlet passage 12 to a position out of the path of fluid passing through the passages 10 and 12. A spring 22 between the lever arm 16 and valve disk 14 tends to urge the valve disk against its seat. In use, the valve is connected between a high pressure line (not shown) secured to the threaded inlet passage 10 and a low pressure outlet line (not shown) connected to the threaded passage 12. Thus the pressure in the line acting through the lever arm 16, tends to hold the valve disk 14 against its seat. In accordance with the invention means are provided for delivering lubricant under pressure to the seat of the valve disk while the valve is closed; the pressure of the lubricant acting in direct opposition to the fluid pressure and tending to compress the spring 22 and hence acting to lift the valve disk from its seat and thereby preventing sticking or "freezing" of the valve in the closed position. These means include an annular seat ring 34 which is press fit, for a portion of its length, into the casing section 4 adjacent the outlet passage 12 so as to be engaged by the valve disk 14 when the valve is closed; the casing being cut away annularly from a point between the base of the ring 34 and the shoulder 36 thereof to provide a trough 28 between the base of the shoulder and the casing and an annular space 30 about the periphery of the shoulder. The casing section 4 is provided with a lubricant admitting passage 26 terminating in the annular trough 28. A suitable grease fitting 32 closes the passage 26 and serves to permit the introduction of lubricant. A light grease, such as vaseline, is suitable for use as the lubricant.

With the above described construction, lubricant may be delivered uniformly through the annular space 30 to the face of the valve disk. When the valve is to be opened, sticking or "freezing" is prevented as sufficient pressure may be applied through the lubricant to move the valve disk laterally against the spring 22, whereupon but little effort is required for operation of lever 20 to swing the lever arm and valve disk out of the path of the fluid. The lubricating means being entirely in the low pressure or outlet side of the valve is not subjected to line pressure and hence no question of possible leakage of pressure, or of back pressure is involved. The construction of the above described lubricating means for the valve requires but few relatively simple operations such as the reaming out of the casing section 4 adjacent the outlet passage for reception of the seat ring, and the drilling of the passage 26. In reaming out the casing section sufficient material must of course be cut away to provide clearance between the shoulder 36 of the seat ring and casing for the annular space 30 and between the base of the shoulder 36 and the casing for the trough 28.

For clarity of illustration, the annular space 30 has been shown in Fig. 1 as larger, in proportion to the valve structure, than would be required for adequate supply of lubricant to the valve seat. In practice but a relatively small clearance between the bushing and casing is sufficient for the purpose.

The following is claimed:

A gate valve comprising in combination, a casing enclosing a chamber and having alined inlet and outlet passages for fluid communicating with said chamber, a lever arm mounted in said chamber for pivotal movement about one end and provided with a recess at its other end, a valve disk carried in said recess for closure of said outlet passage in one angular position, a spring in said recess which, when the valve is closed, acts together with the pressure of fluid in the inlet passage and in the chamber to hold the valve disk in valve closing position, and a seat ring within the outlet passage, said seat ring having a shoulder portion, one end of which, together with the casing wall at the entrance to the outlet passage, provides a seating surface for the valve disk when the valve is closed and a shank portion secured for the major portion of its length in the outlet passage, the part of the outlet passage surrounding the shoulder portion of said seat ring being cylindrical and of a diameter such as to provide an annular space between the shoulder and walls of the passage, the length of such cylindrical part of the outlet passage being greater than the length of the shoulder of the seat ring so as to provide an annular trough at the base of the shoulder of the seat ring, said casing being provided with a passage for introduction of lubricant into said trough, whereby when the valve is closed lubricant delivered under pressure to the valve disk through said annular space from said trough acts upon the valve disk in opposition to said spring and to the pressure of the fluid in the inlet passage and in the chamber to lift the valve disk from the seat ring.

WILLIAM J. WIEHL.